United States Patent Office 2,900,794
Patented Aug. 25, 1959

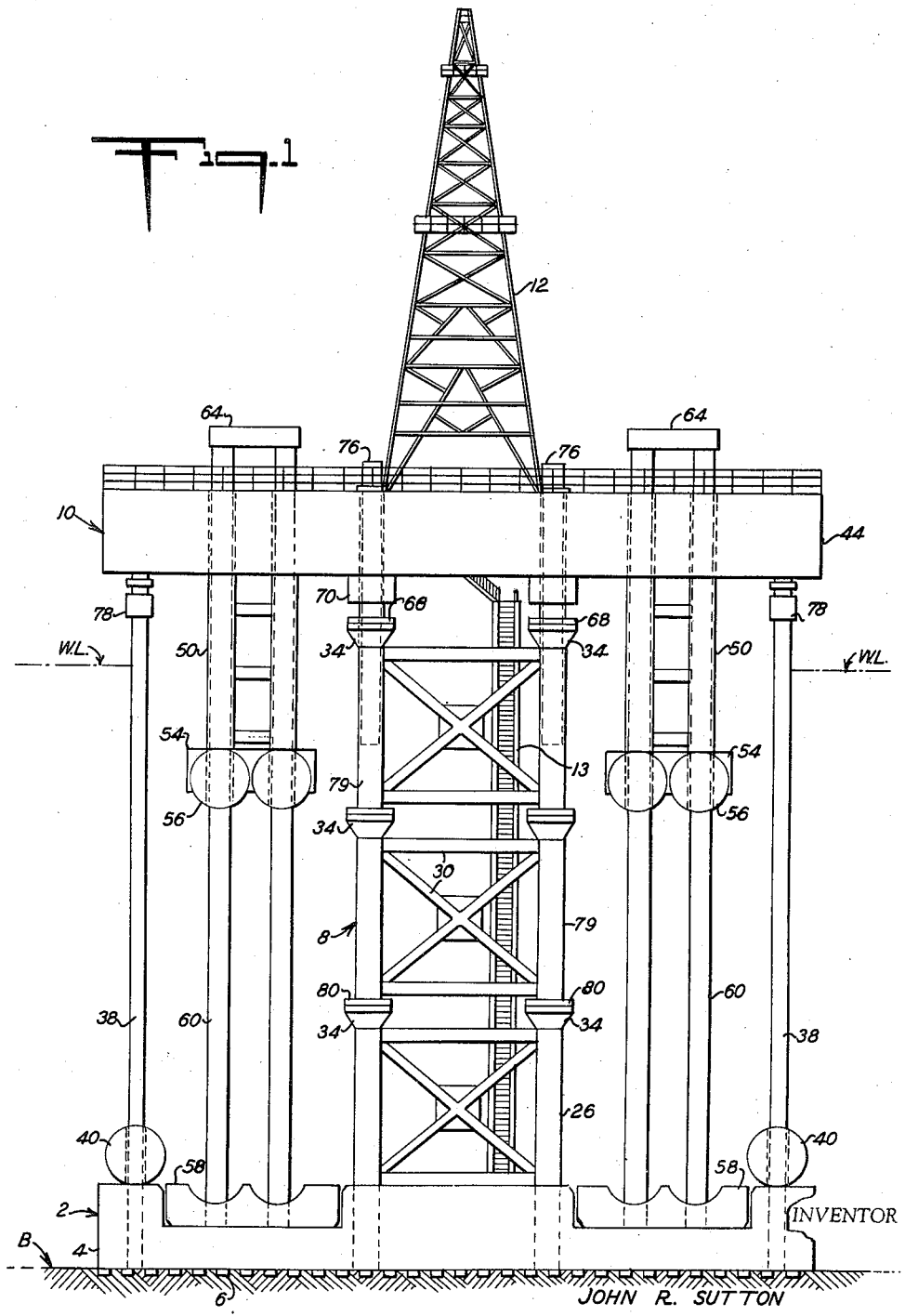

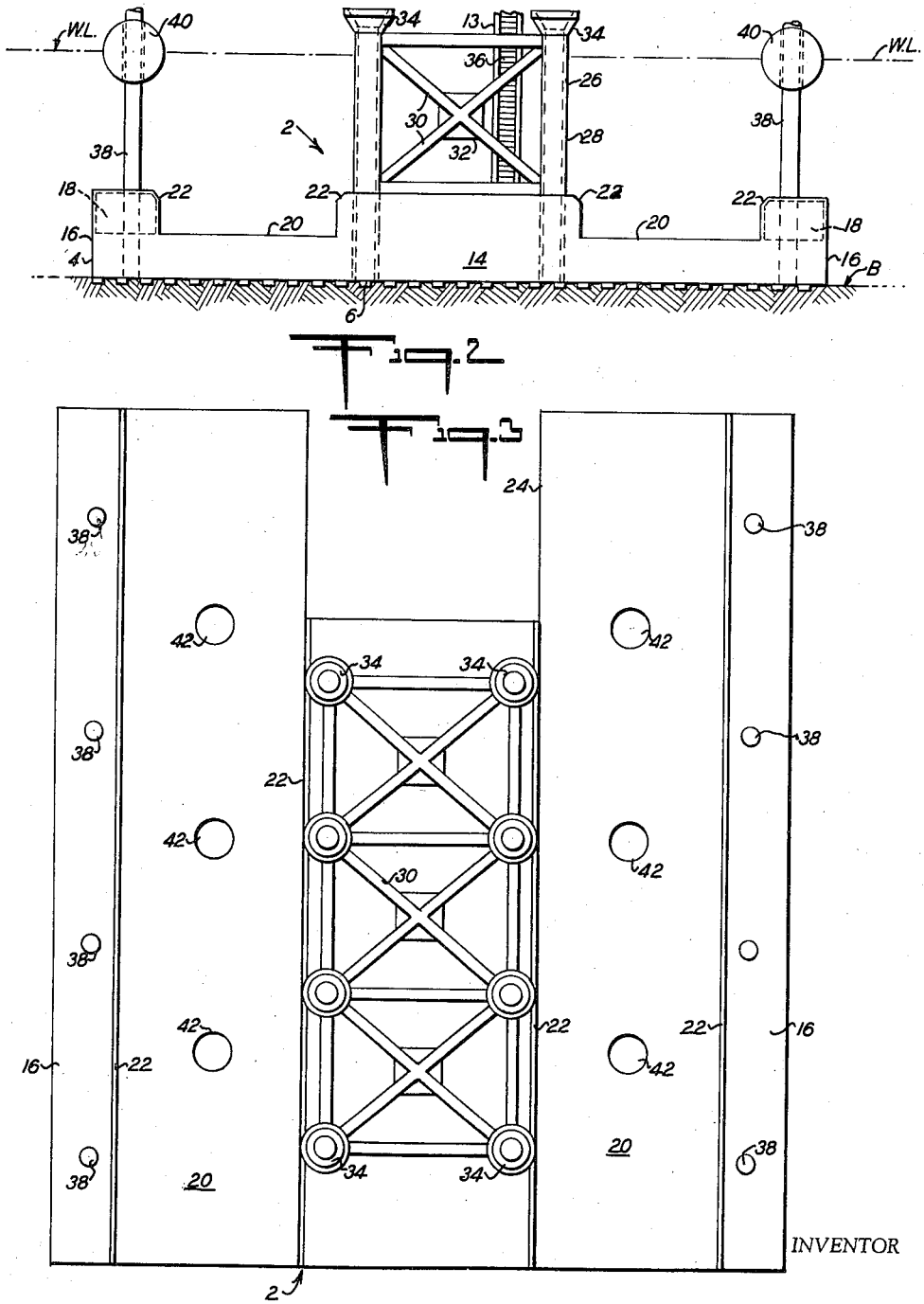

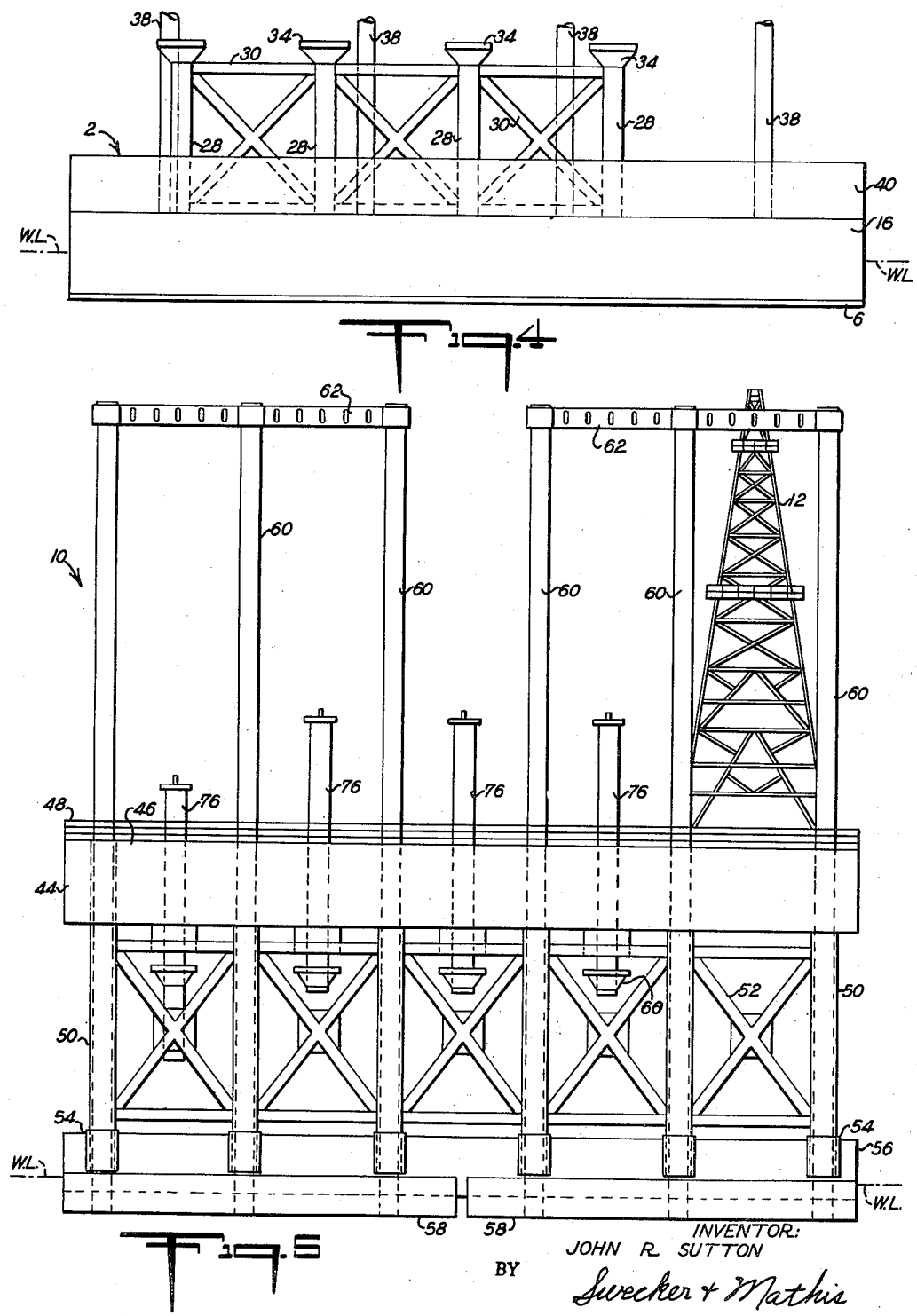

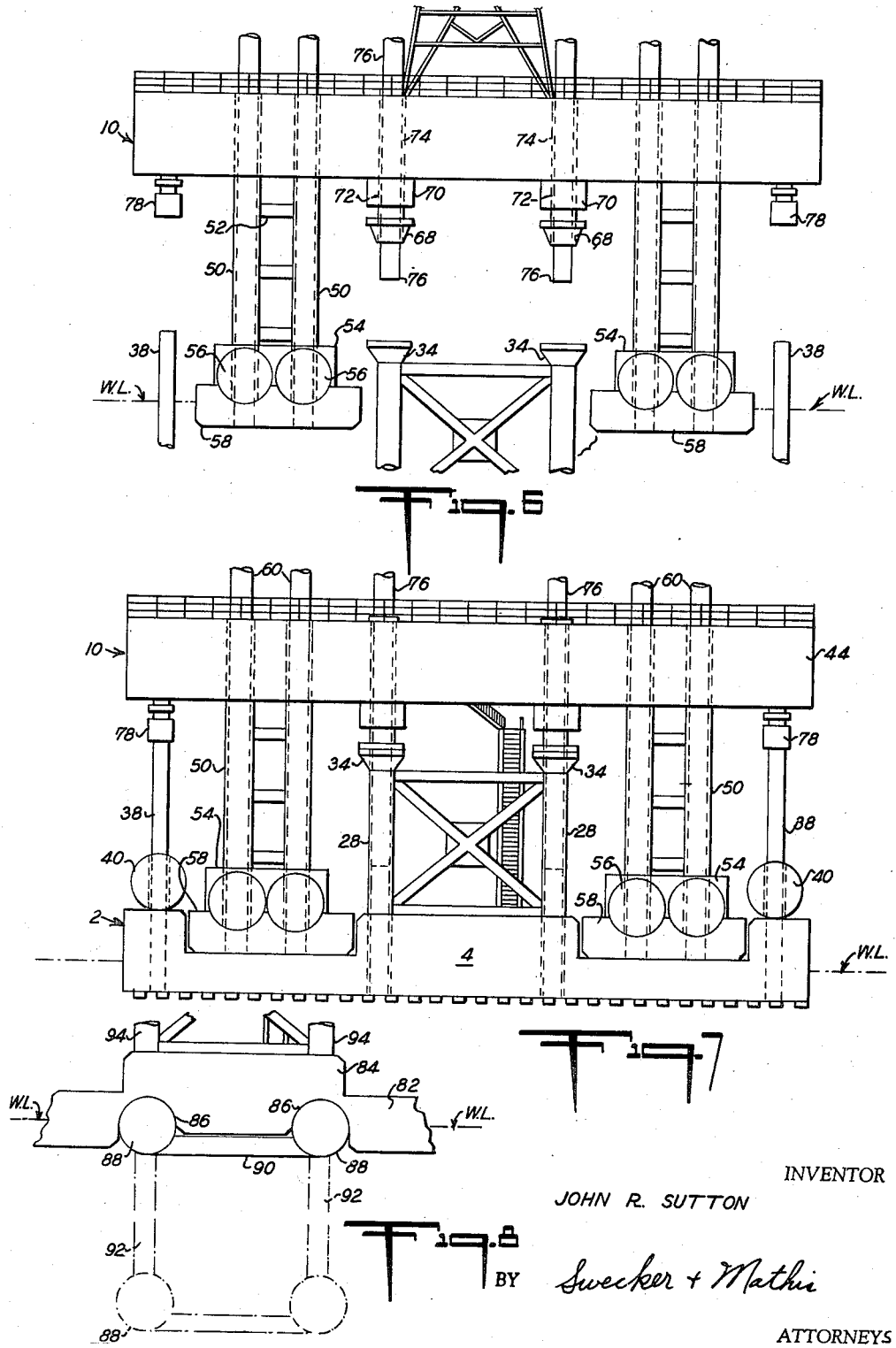

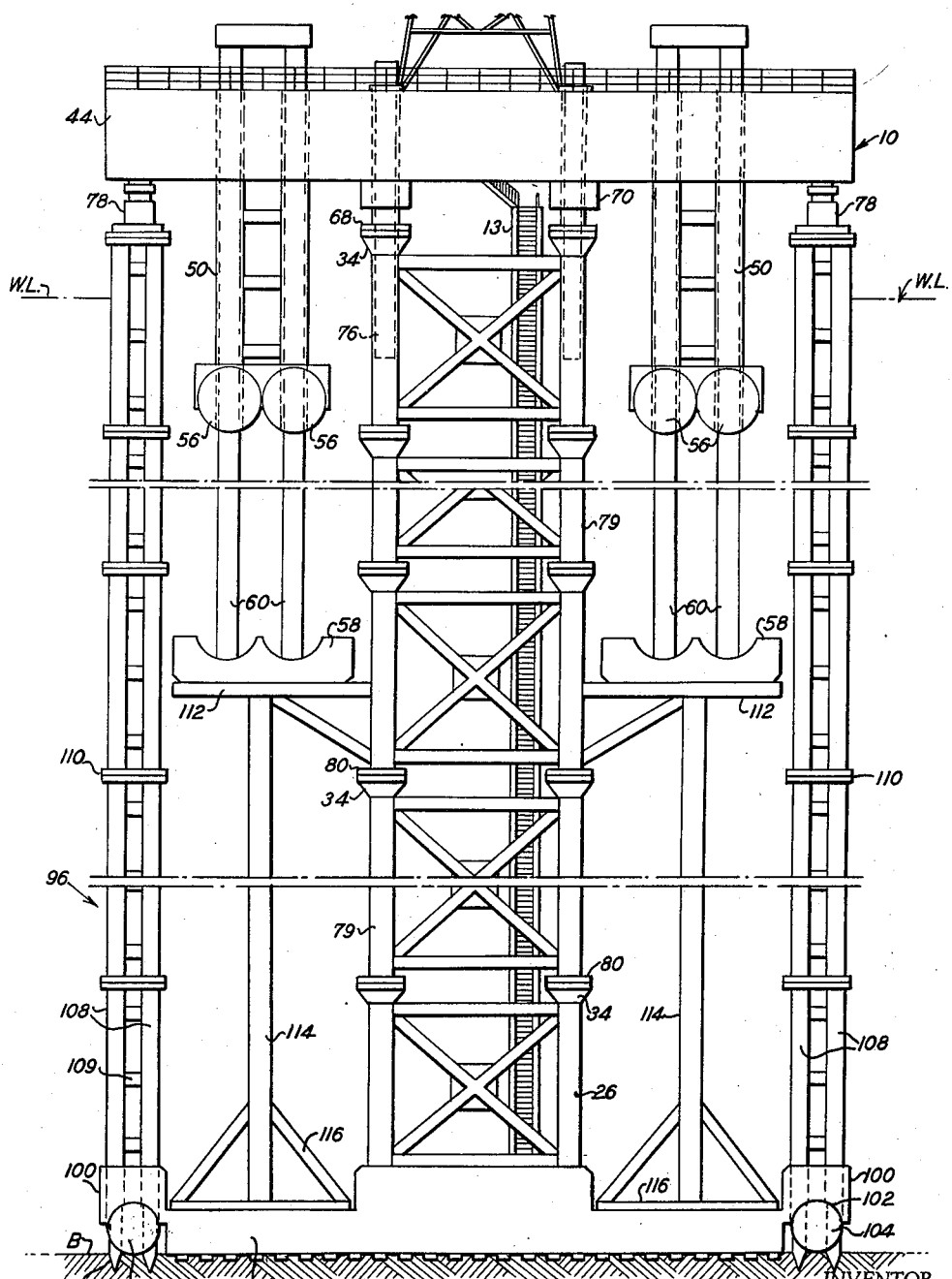
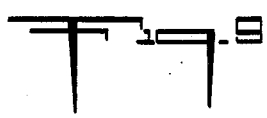

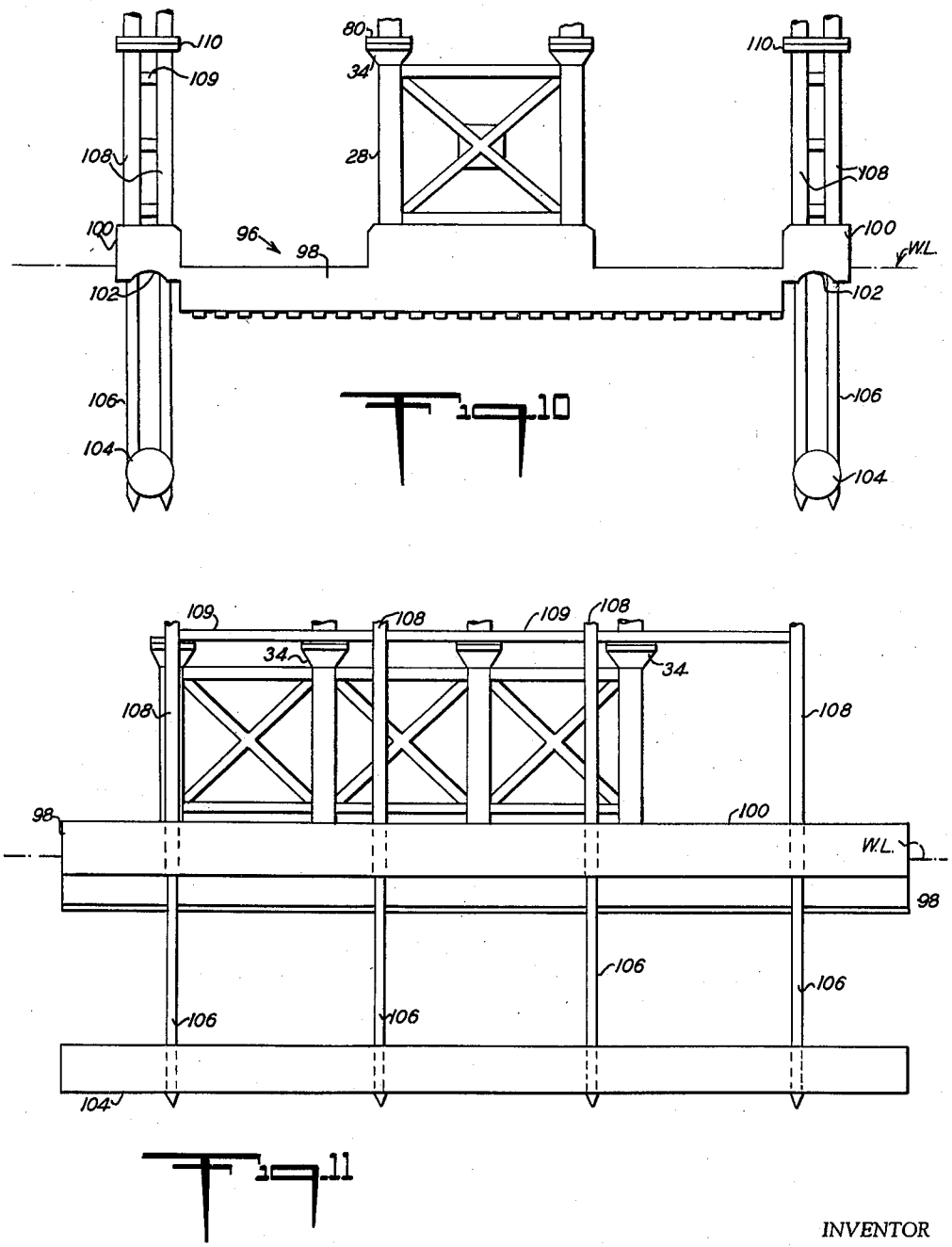

2,900,794

OFFSHORE EQUIPMENT SUPPORTS AND METHODS FOR MAKING SAME

John R. Sutton, Beaumont, Tex.

Application August 26, 1955, Serial No. 530,780

10 Claims. (Cl. 61—46.5)

This invention relates to offshore equipment supports and methods for making same. Although particular reference will be made to the use of such supports in oil recovery operations, other uses, such as for offshore radar stations, for example, will be apparent.

In recent years much attention has been devoted to the recovery of oil, gas, and other natural resources from lands located beneath bodies of water. In general, the procedure followed has included the erection of a stable equipment support structure or island at the site of the proposed well. Such supports may be formed of one or more barges which may be floated to the desired location in the body of water and then sunk so that they become fixed against movement relative to the bottom of the body of water. The support structures carry all or a part of the machinery and other equipment required for the oil recovery operations to be performed. Tender boats having additional machinery may be used in cooperation with the support structures when desired.

Although the use of offshore equipment supports has proved to be desirable as an approach to the problem of recovering natural resources from lands beneath bodies of water, the structures of the prior art and the methods employed in assembling these structures have been subject to certain disadvantages. Therefore, it is an object of this invention to provide offshore equipment supports which will function efficiently under the severe service conditions imposed upon them and which may be erected with ease and safety.

This invention contemplates the use of two separately floatable barge units, a foundation barge unit and a platform barge unit. These units may be connected together at a shore establishment, or they may be moved independently to position in the body of water and then assembled to form a complete equipment support. In a general way the latter system may be compared to that disclosed in Patent No. 2,652,693 to Goldman et al. However, the present invention includes many refinements and improvements over the structures and methods of the Goldman et al. patent. It is easier and safer to assemble, cheaper, more effective as a machinery support, and better adapted for use at locations where the water is very deep.

During the sinking of the foundation unit, the descent of the base portion of the unit is controlled so as to prevent it from tilting and moving away from the desired location. Such control is maintained by a combination of novel features in the construction.

Outrigger buoyancy compartments, fixed to the base along its opposite sides, perform valuable stabilizing functions. By decreasing the buoyancy of other buoyancy compartments in the base prior to decreasing the buoyancy of the outrigger buoyancy compartments, the tendency of the unit to list so sharply as to get out of control is minimized.

Still other devices assist in the job of controlling the descent of the foundation unit. According to one embodiment of this invention, a number of guides extend upwardly from the base to a height approximating the depth of the water at the desired location. These guides are fixed rigidly to the base in groups extending along opposite sides thereof. During the descent of the base, the guides are maintained in their vertical positions by means of auxiliary buoyancy tanks which are carried by the guides for vertical movement relative thereto. These auxiliary tanks float on the surface of the water as the base of the foundation unit is descending. After the base is in position on the bottom, the auxiliary tanks preferably are flooded so that they will move down the guides to positions well below the zone of wave action.

According to another embodiment of this invention, the sinking of the base of the foundation unit is controlled by piles or spuds mounted for vertical movement with respect to the base. The piles or spuds have pointed lower ends adapting them for firm engagement with the bottom of the body of water, and their up-and-down movement is controlled by buoyancy tanks which are fixed near their lower ends. Normally, these tanks contain air, and the spuds are held in elevated positions. However, when the foundation unit has been moved into position, the tanks are flooded and the spuds sink. When the spuds are anchored, the base cannot tilt during sinking.

The foundation unit includes in addition to the base already mentioned a central superstructure which extends upwardly to a height approximating the depth of the water. The superstructure supports the platform barge unit of the offshore equipment support structure of this invention. This unit is moved into position above the submerged foundation and the two are connected together in a novel fashion.

The platform proper of the platform barge unit is located well above the water line when the unit is afloat under normal conditions. It is not difficult, therefore, to bring the platform into position over the top of the superstructure of the foundation unit. When the platform barge unit is in position, guides are extended between the two units, and then the buoyancy of buoyancy compartments of the platform barge unit is decreased to allow the platform to settle upon the superstructure. The platform preferably is held above the surface of the water by the superstructure.

The present invention permits good control over the settling of the platform barge unit. Some of the buoyancy compartments of this unit are mounted so that they may move vertically below the platform, and others are fixed with respect to the platform. The movable compartments are flooded first. These sink into engagement with portions of the base of the foundation barge unit while the platform barge unit is still afloat. Thus, the mass of the platform unit is significantly reduced prior to the settling of this unit, and additionally, a vertical guide system is established.

The platform barge construction just described has another very important advantage. Units of this type are necessarily quite tall. For deep water operations they may stand in the air 200 feet or more. This means, of course, that they are relatively instable when afloat, and serious losses have been suffered on occasions when these barges have turned over. The present invention overcomes this objection by the expedient of lowering the movable buoyancy compartments during the towing of the barge. These compartments may be positioned as far below the surface of the water as necessary, to act as a keel or stabilizing balance to offset the weight of the structure located high in the air above the platform of the barge.

The foundation barge unit of the present invention may embody features which would give it the advantages outlined in the preceding paragraph. It may be provided with a set of centrally located, vertically movable, buoyancy tanks which may be lowered or raised during the towing of the unit.

Other features and advantages of the present invention will become apparent from the following detailed description of certain embodiments thereof illustrated in the accompanying drawings in which:

Fig. 1 is an end elevational view of an offshore support structure for drilling equipment in position for use;

Fig. 2 is an end elevational view of a foundation barge unit of the type used in the structure of Fig. 1, such unit being located upon the bottom of a shallow body of water;

Fig. 3 is a plan view of the foundation barge unit of Fig. 2 with certain parts omitted;

Fig. 4 is a side elevational view of the foundation barge unit of Fig. 2, with certain parts omitted and showing the unit afloat;

Fig. 5 is a side elevational view of a platform barge unit such as that incorporated in the structure of Fig. 1;

Fig. 6 is an end elevational view showing portions of the foundation barge unit of Fig. 2 and the platform barge unit of Fig. 5 as they appear soon after the platform unit has been moved into position above the submerged foundation unit;

Fig. 7 is an end elevational view of a completely assembled equipment support structure for shallow water use, the structure being floatable as a single unit;

Fig. 8 is a fragmentary end elevational view of a modified foundation barge having auxiliary buoyancy tanks which may be lowered to provide a balancing keel;

Fig. 9 is an end elevational view of another embodiment of this invention showing the elements in the positions they occupy when the support is ready for use;

Fig. 10 is an end elevational view of a foundation unit of the type incorporated in the structure of Fig. 9 showing the parts in the positions they occupy just before the base of the foundation is sunk; and Fig. 11 is a side elevational view of the unit shown in Fig. 10.

In some of these views the water line WL and the bottom B of a body of water have been indicated in order to make the relationships described below easier to understand.

Referring first to Fig. 1 of the drawing, the general relationship of the barge units will be described. The equipment support structure is anchored to the bottom B of the body of water by means of a foundation barge unit 2 which comprises a large base 4 having ground engaging runners or protruding footings 6 upon its lower surface.

The foundation unit 2 has fixed thereto a superstructure 8 which supports a platform barge unit 10 at a level above the surface of the body of water. The platform barge unit carries at least some of the equipment necessary for the drilling operations to be performed. As an example, a derrick 12 has been illustrated in Fig. 1. The platform unit 10 also must include living quarters for a crew.

The internal structures of the base 4 and the platform unit 10 have not been illustrated in detail because these may vary according to the requirements of a particular job. In general, however, it is pointed out that each of these includes a plurality of enclosed, watertight compartments.

The base 4 preferably has an internal compartment which may be occupied when desired by members of the crew. This compartment is provided with pumps and other equipment used in the manipulation of the foundation barge itself. A watertight entrance hatch or casing 13, having suitable ladder or elevator means, is illustrated, for providing access to such compartment. Additionally, the base 4 has a number of floodable compartments so that its buoyancy may be varied as desired.

The external configuration of the foundation unit 2 shown in Fig. 1, and the method of positioning it at the bottom of the body of water, may best be understood by reference to Figs. 2, 3, and 4. The base 4 of the unit 2 includes an enlarged central portion 14, which may be used for compartment spaces, and side portions 16 of increased height. The upper zones of the enlarged portions 16 are provided with outrigger buoyancy compartments 18, shown in dotted lines in Fig. 2.

Between the portions 14 and 16, the upper surface of the base 4 forms seats 20 which receive buoyancy compartments from the platform barge unit 10, as illustrated in Fig. 1. The upper edges of the walls of the seats 20 preferably are bevelled as indicated at 22 to guide the descending buoyancy compartments into position.

The central portion of the foundation barge unit 2 is slotted at 24 (Fig. 3) to provide a space through which the well drilling equipment may extend downwardly from the platform barge unit 10 into the earth below the body of water. When it is desired to move the unit to another location, it may be shifted laterally so that the well elements move out of the slot 24.

The central portion of the base 4 of the foundation barge unit 2 also supports a superstructure section 26. Preferably, the section 26 is fixed rigidly to the base 4. It includes a number of columns 28 held in vertical positions by suitable braces 30. In assembling the columns and braces, the joints formed by two members meeting at an angle are reinforced by plates 32 which are welded to both of the members. These plates have been illustrated in many of the figures of the drawings, but it will be understood that the illustrations are purely diagrammatic. It is not intended that the drawings should represent the true proportions of these members and plates. The brace members 30 and the columns 26 are circular in external cross-section so as to minimize the effects of wind and waves upon the structure.

As shown in Fig. 2, the foundation unit 2 includes a section of the access hatch 13. A ladder 36, extending along the external surface of the hatch 13, is useful particularly during periods when the foundation unit is afloat. This structure has been omitted from Figs. 3 and 4 in the interest of clarity.

Extending upwardly through the side portions 16 of the base 4 are a number of posts or guides 38. These are fixed to the base 4, and they have lengths such that they extend approximately to the level of the surface of the water when the unit 2 is submerged. The group of guides in each side of the base 4 carries an auxiliary buoyancy tank 40 for vertical sliding movement.

The foundation barge unit 2 is floated to position over the surface of the body of water with the parts in the positions indicated in Fig. 4. There it is anchored, or tied to another vessel, to hold it steady so that the submerging operation may be begun. While the outrigger compartments 18 and the auxiliary tanks 40 are maintained in buoyant conditions, other compartments of the base 4 are flooded. As the overall buoyancy of the base 4 is decreased, it sinks to a position in which it is supported at least partially by the outrigger buoyancy compartments 18. Thus, the outrigger buoyancy compartments 18 perform the very valuable function of allowing portions of the base 4 to become submerged while the base is being held on an even keel. The displacement of the compartments 18 may exceed the weight of the foundation barge unit 2, or it may be somewhat less. The control effects described above are achieved with either arrangement. If the compartments 18 are large enough to support entirely the unit 2, it is preferred that they be located so that the water line of the unit, when supported in this way, is located above substantial portions of the upper surface of the base 4. Moreover, it should be noted that it would be necessary to decrease the buoyancy of such large compartments 18 in order to continue the sinking operation. A two-step operation of this kind might be preferable in some situations to a single step operation.

As the descent of the base 4 continues, the still buoyant tanks 40 remain upon the surface of the water to restrain the posts or guides 38 against tilting movement. (See Fig. 2.) Since these guides 38 are fixed rigidly to the base 4, the base 4 is maintained in a horizontal position.

The guiding of the base 4 during sinking is made easier by the provision of a number of large holes 42 (Fig. 3) through the base. These holes allow the water to rush through the base, and the tendency of the base to tilt is minimized.

After the foundation barge unit 2 has been positioned upon the bottom, the auxiliary tanks 40 preferably are flooded to allow them to sink along the guides 38 to the base 4. The flooding of the outrigger compartments 18 may also be completed at this time so as to make the structure as stable as possible.

When the unit 2 is to be removed from its position on the bottom of the body of water, the water in the auxiliary tanks 40 may be pumped out again to cause them to float. The ascent of the base 4 then may be controlled in the same fashion as its descent.

At their upper ends, each of the columns 28 carries a conical socket element 34. These socket elements 34 are used in seating elements of the superstructure, or of the platform barge unit, upon the foundation unit.

Fig. 5 illustrates a platform barge unit 10 of the type employed in the structure of Fig. 1 as it appears when it is detached from the foundation unit and floating upon the surface of a body of water. The platform unit 10 includes a platform proper or equipment support 44, upon which the equipment to be used at the offshore location is mounted. The platform 44 has many internal compartments for machinery and the like, as well as an upper deck 46 upon which equipment may be located. In the drawings, a railing structure 48 is illustrated as surrounding the upper deck 46.

Fixed to and depending from the platform 44 are a number of guide tubes 50 of substantial size and strength. There are two groups of the tubes 50, one on each side of the platform barge unit 10, as indicated in Fig. 6 for example. The tubes 50 of each group are connected together by a network of braces 52 which maintains them in the desired positions.

The lower ends of the tubes 50 of each group are fixed to brackets 54 which carry cylindrical buoyancy tanks 56. As illustrated, there are two buoyancy tanks 56 in each group. This is a desirable arrangement because, in the sinking of the pair, water may flow upwardly between the two tanks with minimum resistance. It will be apparent, however, that other arrangements also could be used.

When the platform barge unit 10 is being floated to position, the cylindrical buoyancy tanks 56 are seated upon the upper surfaces of four buoyancy compartments 58 of generally rectangular configuration. The compartments 58 are located at the four corners of the barge unit so that each pair of cylindrical tanks 56 is seated upon two of the compartments 58, as indicated in Fig. 5.

The buoyancy compartments 58 are attached to the lower ends of long guide rods 60 which extend upwardly through the guide tubes 50 and the platform 44. At their upper ends the rods 60 attached to each of the buoyancy compartments 58 are connected together by members 62 (Fig. 5) and 64 (Fig. 1). The long bearing area between the guide rods 60 and the tubes 50, taken with the fact that the upper ends of the rods 60 are secured rigidly together in groups, gives assurance that the rods will be maintained in upright positions in spite of their extremely long lengths.

Depending from a central portion of the platform 44 are a number of coupling units which include generally conical lower end portions 68 and portions 70 of adjustable length. The particular structure employed in the portions 70 forms no part of the present invention and need not be described in detail. The adjustments contemplated are for the purpose of levelling the platform 44 when the barge unit 10 has been attached to the superstructure of the foundation unit.

The coupling units have vertical openings 72 extending therethrough in communication with openings 74 through the platform 44 to receive vertically movable guide rods 76. Suitable means are installed in the platform 44 for raising and lowering the guide rods 76 as desired. Such means are well known in the art and need not be disclosed in detail here.

Also depending from the platform 44 of the platform barge unit 10 are coupling devices 78. There is one coupling device 78 for each of the posts or guides 38 extending upwardly from the base 4 of the foundation unit 2.

The procedure followed in attaching the platform barge unit 10 to the foundation barge unit 2 will now be described. After the foundation unit has been sunk at the desired location in the body of water, the platform barge unit 10 is towed into position directly over the foundation unit. Such a position is indicated in Fig. 6. Then, a connecton between the two units is established by lowering the guide rods 76 into the columns 28 of the foundation superstructure. The lower ends of the guide rods 76 are guided into the columns 28 by means of the conical fittings 34 on the upper ends of the columns.

After the lateral positions of the two units relative to each other have been fixed through the use of the guide rods 76, the platform unit is caused to settle upon the foundation unit so as to be supported thereby. The first step in the settling process is the lowering of the buoyancy compartments 58 of the platform barge unit 10 into the seats 20 on the upper surface of the base 4 of the foundation unit 2. Such lowering is accomplished as a series of steps in order to maintain maximum stability during the process. The compartments 58 are flooded sequentially, with diagonally opposed compartments being lowered approximately together.

After the compartments 58 have been moved into position on the base 4 of the foundation unit, the platform 44 is maintained in an elevated position by means of the cylindrical buoyancy tanks 56. It should be noted, however, that even though the platform 44 has not yet moved substantially, much of the mass of the platform unit has been moved far below the surface of the water where it is no longer subject to the force of the waves.

The actual settling of the platform 44 takes place when the cylindrical buoyancy tanks 56 are flooded. As the unit loses its buoyancy, the platform 44 and the cylindrical tanks 56 slide downwardly along the guide rods 60 attached to the submerged buoyancy tanks 58, and the guide rods 76 extend into the columns 28.

Downward movement of the platform 44 ceases when the conical coupling elements 68 move into the conical fittings 34 on the superstructure of the foundation unit. The mating cones serve to wedge the elements together. Additional holding power may be achieved by welding or bolting the flanges of the elements 68 to the flanges of the fittings 34.

Additional support for the sides of the platform 44 is provided by the guide posts 38, the upper ends of which may be attached to the fittings 78 depending from the platform 44. This completes the assembly of the offshore equipment support.

The numeral 79 in Fig. 1 is applied to a preformed superstructure unit. Each of these units is very similar to the superstructure unit 26 permanently fixed to the base 4 of the foundation unit 2. However, it must have on its lower end fittings 80 corresponding in shape to the elements 68 on the platform unit 10. The fittings 80 cooperate with the fittings 34 on the upper ends of the columns 28 so that the units 79 may be fixed to the unit 26 and to each other.

The depth of the water at the desired offshore location determines how many, if any, of the superstructure units 79 will be attached to the superstructure unit 26. The total height of the superstructure 8 should be such as to position its upper end close to the surface of the water. Although the upper end of the superstructure might be located slightly below the surface of the water, the work of attaching the platform unit to the foundation unit can be carried out with greater ease and safety if the superstructure projects slightly above the surface of the water as indicated in the drawings.

The lengths of the guides 38 and 60 must also be varied in accordance with the depth of the water. This may be accomplished in several ways, such as, for example, by making rods from a plurality of sections corresponding in length to the heights of the superstructure units 79.

Although the description so far has been directed to the assembly of the foundation barge unit 2 and the platform barge unit 10 at an offshore location, it is pointed out that the units may be fixed together at a shore installation and then floated offshore in the assembled condition. This procedure is indicated by the illustration in Fig. 7. It is probable that this technique will be useful primarily in connection with machinery supports to be used in shallow water. If the structure were very tall, the heavy weights located on the platform 44 high above the surface of the water, would make the structure relatively unstable, and it probably would be difficult to move the structure to the desired offshore location.

In the sinking of the pressembled equipment support structure illustrated in Fig. 7, one need follow only the steps outlined above in connection with the sinking of the foundation unit 2. The buoyancy compartments 56 and 58 of the platform barge unit in the preassembled structure may be used to store oil, fresh water, or other provisions.

Fig. 8 illustrates another variation of the invention. As indicated above, the stability of barges of the type with which the present invention is concerned may be a serious problem. The construction indicated by Fig. 8 overcomes the problem of stabilizing the barge during the towing operations by providing a unit which may be lowered beneath the surface as far as is necessary to balance the loads located in the air above the water.

The barge of Fig. 8 is similar in most respects to the foundation barge 2 illustrated in Fig. 2. Consequently, only a portion of it has been shown in the drawings. The barge includes a base 82 having a central portion 84 which corresponds generally to the central portion 14 of the base 4 illustrated in Fig. 2. However, the lower surface of the portion 84 has recesses 86 which provide seats for cylindrical buoyancy tanks 88 connected together by lateral braces 90.

The cylindrical buoyancy tanks 88 are attached to the lower ends of guide rods 92 which slide within columns 94 extending upwardly from the portion 84 of the base. The columns 94 correspond in all respects to the columns 28 of the foundation barge 2 described above.

As indicated by the dotted lines in Fig. 8, the cylindrical buoyancy tanks 88 may be lowered beneath the surface of the water to whatever extent is necessary to balance the weights located above the surface of the water. Lock means of any suitable structure are provided on the base 82 to fix the rods 92 at the desired level. The submerged buoyancy tanks 88 and the rods 92 serve as a keel or stabilizing balance to offset the height of the superstructure in the air, thus making it impossible for the barge to capsize. The tanks 88 need not be flooded to such an extent that they add significantly to the load on the barge itself. It is sufficient that they be flooded enough to sink so as to lower the center of gravity of the structure as a whole.

The buoyancy tanks 88 are returned to their seats 86 in the base 82 of the barge during the sinking of the barge.

It should be noted at this point that the technique outlined in connection with Fig. 8 may be utilized in the towing of the platform barge unit illustrated in Figs. 5 and 6 without any changes in the structure of such unit. The buoyancy compartments 58 may be lowered to provide the desired stabilizing effect.

Still another embodiment of the invention is illustrated in Figs. 9, 10, and 11. The platform barge unit 10 may be identical with that described heretofore, but it cooperates with a foundation barge unit 96 of a somewhat different structure.

The foundation barge unit 96 differs from the foundation unit 2 in the means provided for guiding the descent of the base of the unit during the sinking operations. In the embodiment shown in Figs. 9, 10, and 11, the sides of the base 98 are provided with outrigger buoyancy compartments 100 having seats 102 in their lower surfaces for auxiliary tanks 104. Each of the tanks 104 is attached to the lower ends of a group of spuds or piles 106.

The piles or spuds 106 extend upwardly through guide tubes 108, which are suitably connected together and braced by members 109 to give them the necessary rigidity. As indicated in the drawings the tubes 108 are made in sections corresponding in length to the height of the superstructure sections so that these may be secured together as at 110 to provide whatever length is required by the depth of the water at the particular location where the structure is to be used.

When the foundation barge unit 96 has been moved into position, the displacement of the tanks 104 is decreased sufficiently to cause them to sink to the bottom of the body of water. This brings the pointed lower ends of the spuds or piles 106 into holding engagement with the bottom to anchor the structure in position. Then the base 98 of the unit is caused to descend along the piles 106 by flooding the buoyancy compartments therein.

When it is desired to recover the foundation unit 96 so that it may be used in some other location, the base 98 may be raised upon the spuds 106 by pumping the water out of the buoyancy compartments in the base, and then the spuds 106 may be lifted by pumping the water out of the buoyancy tanks 104 attached thereto.

It should be noted that the provision of buoyant compartments 40, 58, 88, and 104 in the several embodiments described heretofore eliminates the need of much of the expensive equipment in use on offshore rigs at the present time. According to this invention, simple pumping apparatus is used instead of complicated hydraulic and pneumatic jacks.

Another variation illustrated in Fig. 9 is the use of an elevated support 112 for the buoyancy compartments 58 of the platform barge unit. The supports 112 are attached to the superstructure and to columns 114 extending upwardly from the base 98. The lower end of each of the columns 114 is mounted in a footing structure 116 which may rest upon a seat on the base 98. When the foundation unit is assembled in this fashion, the guide rods 60 for the buoyancy compartments 58 need not be so long. This factor will be particularly significant in connection with structures to be used in very deep water.

Although certain specific embodiments of the invention have been described in detail, various alterations and modifications will be apparent to persons skilled in the art, and it is intended, therefore, that the foregoing description should be considered as exemplary only. The scope of the invention is to be determined from the claims which follow.

I claim:

1. A method of assembling a structure for supporting equipment at an offshore location in a body of water comprising, floating to position and then sinking to the bottom of the body of water a foundation unit; floating to a position above said foundation unit a platform unit having an equipment support, vertically movable guide means, first controllable buoyancy means mounted for up and down movement relative to said support, and second controllable buoyancy means fixed with respect to said support; lowering said guide means into engagement with said foundation unit; decreasing the buoyancy of said first buoyancy means to sink such means onto said foundation unit at a level far below the surface of the water; and then decreasing the buoyancy of said second buoyancy means to lower said support to a position in which it is supported by said foundation unit.

2. A method of assembling a structure for supporting equipment at an offshore location in a body of water comprising, floating to position a foundation unit including a base adapted to rest upon the bottom of the body of water and a superstructure extending upwardly from said base; and then sinking said foundation unit so that said base rests upon the bottom of the body of water and said superstructure extends to a level near the surface of the water; floating to a position above said superstructure a platform unit including an equipment support, guide means mounted for vertical movement relative to said support, first controllable buoyancy means mounted for vertical movement relative to said support, and second controllable buoyancy means fixed with respect to said support; lowering said guide means into engagement with said superstructure; sinking said first buoyancy means onto said base; and then decreasing the buoyancy of said second buoyancy means to lower said support onto said superstructure.

3. A structure for supporting equipment at an offshore location in a body of water comprising a base adapted to rest upon the bottom of the body of water, first buoyancy means fixed with respect to said base, and being controllable as to its buoyancy to cause said base to float or to sink as desired, a superstructure on said base extending upwardly a distance approximating the depth of the water at the offshore location, vertical guides rigid with and extending upwardly from said base on opposite sides of said superstructure, second buoyancy means slidably connected with said guides for vertical movement relative thereto, a floatable equipment support for positioning above said superstructure, guide means carried by said support for vertical movement relative thereto, means for detachably connecting said guide means to said superstructure, and means for detachably connecting the upper ends of said guides carried by said base to said support.

4. A structure for supporting equipment at an offshore location in a body of water comprising a base adapted to rest upon the bottom of the body of water, first buoyancy means fixed with respect to said base and being controllable as to its buoyancy to cause said base to float or to sink as desired, a superstructure on said base extending upwardly a distance approximating the depth of the water at the offshore location and including a member shaped to provide an upwardly opening socket at the upper end of said superstructure, an equipment support including a platform above the surface of the water, second buoyancy means below and connected to said platform and being controllable as to its buoyancy to sustain said support or not as desired, and a guide carried by said platform for vertical movement relative thereto, said guide having an upper portion above the surface of the water and a lower portion removably disposed within said socket, whereby said structure may be assembled by sinking said base, moving said platform into a position thereabove, lowering said guide into said socket, and then sinking said second buoyancy means to lower said support onto said superstructure.

5. A structure for supporting equipment at an offshore location in a body of water comprising a base adapted to rest upon the bottom of the body of water, first buoyancy means fixed with respect to said base and being controllable as to its buoyancy to cause said base to float or to sink as desired, a superstructure on said base extending upwardly a distance approximating the depth of the water at the offshore location and including a member shaped to provide an upwardly opening, downwardly converging socket at the upper end of said superstructure, an equipment support including a platform above the surface of the water, second buoyancy means below and connected to said platform and being controllable as to its buoyancy to sustain said support or not as desired, and a guide carried by said platform for vertical movement relative thereto, said guide having an upper portion above the surface of the water and having a lower portion removably disposed within said socket, whereby said structure may be assembled by sinking said base, moving said platform into a position thereabove, lowering said guide into said socket and then sinking said second buoyancy means to lower said support onto said superstructure.

6. A structure for supporting equipment at an offshore location in a body of water comprising a base adapted to rest upon the bottom of the body of water, first buoyancy means fixed with respect to said base and being controllable as to its buoyancy to cause said base to float or to sink as desired, a superstructure on said base extending upwardly a distance approximating the depth of the water at the offshore location and including an upwardly opening, downwardly converging, conical socket at the upper end of said superstructure, an equipment platform above the surface of the water, a depending support rigid with said platform and having at its lower end a conical portion conforming to and disposed within said conical socket, said support having an opening extending vertically through the center of said conical platform, a guide slidably mounted in said vertical opening, said guide having an upper portion above the surface of the water and a lower portion disposed within said socket, and second buoyancy means below and connected to said platform and being controllable as to its buoyancy to sustain said platform or not as desired, whereby said structure may be assembled by sinking said base, moving said platform into a position thereabove, lowering said guide into said socket, and then sinking said second buoyancy means to lower said conical portion of said support into said socket.

7. The process of using the buoyancy means of a floating body of the type having buoyant compartments along opposite sides thereof, guide means disposed inwardly of the sides of said body and connected to said body for vertical movement relative thereto, and regulatable buoyancy means fixed to said guide means below and inwardly of the sides of said body; which process comprises decreasing the buoyancy of said buoyancy means to cause said means to move downwardly a substantial distance below the central portion of said body to form a stabilizing keel, and then moving said floating body horizontally over the water.

8. A structure for supporting equipment at an offshore location in a body of water comprising a base adapted to rest upon the bottom of the body of water, first buoyancy means fixed with respect to said base and being controllable as to its buoyancy to cause said base to float or to sink as desired, a superstructure on said base extending upwardly a distance approximating the depth of the water at the offshore location and including a plurality of upwardly opening sockets at its upper end, an equipment platform above the surface of the water, a plurality of depending supports rigid with said platform, each of said depending supports having its lower end portion disposed within one of said sockets and each of said supports having a vertical opening therethrough, a guide slidably mounted in each of said vertical openings and having a lower portion disposed within one of said sockets, and second buoyancy means below and connected to said platform and being controllable as to its buoyancy to sustain said platform or not as desired, whereby said structure may be assembled by sinking said base, moving said platform into a position thereabove, lowering said guides into said sockets, and then sinking said second buoyancy means to lower said supports into said sockets.

9. A structure for supporting equipment at an offshore location in a body of water comprising a base having associated therewith first buoyancy means the buoyancy of which is controllable over a sufficient range to cause said base to float or to sink to the bottom of the body of water as desired, a superstructure on said base extending upwardly therefrom, said base having a plurality of recesses in its upper surface spaced laterally on opposite sides of said superstructure, an equipment platform above the surface of the water, means fixed to and depending from said platform for detachably connecting said platform to said superstructure, a plurality of buoyancy compartments disposed below said platform and in line with said recesses in the upper surface of said base, and rigid guides fixed to said compartments and extending upwardly therefrom through said platform and being mounted for vertical sliding movement relative to said platform so that said compartments may be lowered into said recesses.

10. A structure for supporting equipment at an offshore location in a body of water comprising a base having associated therewith first buoyancy means the buoyancy of which is controllable over a sufficient range to cause said base to float or to sink to the bottom of the body of water as desired, a superstructure on said base extending upwardly therefrom, said base having a plurality of recesses in its upper surface spaced laterally on opposite sides of said superstructure, an equipment platform above the surface of the water, means fixed to and depending from said platform for detachably connecting said platform to said superstructure, a plurality of tubes fixed to and depending from said platform on opposite sides of said superstructure, second buoyancy means fixed to the lower ends of said tubes, vertical guides mounted for vertical sliding movement in said tubes and extending below the lower ends of said tubes, and buoyancy compartments disposed in line with said recesses in the upper surface of said base and fixed to the lower ends of said guides so that said compartments may be lowered into said recesses.

References Cited in the file of this patent

UNITED STATES PATENTS

| | | |
|---|---|---|
| 2,217,879 | Willey | Oct. 15, 1940 |
| 2,482,788 | Moon | Sept. 27, 1949 |
| 2,589,146 | Samuelson | Mar. 11, 1952 |
| 2,603,068 | Wilson | July 15, 1952 |
| 2,652,693 | Goldman et al. | Sept. 22, 1953 |
| 2,653,452 | Dawson | Sept. 29, 1953 |
| 2,772,539 | Sandberg | Dec. 4, 1956 |